M. S. CUMNER AND F. W. GEISSENHAINER.
LEAD TESTING APPARATUS.
APPLICATION FILED SEPT. 18, 1918.
1,307,347.
Patented June 24, 1919.
2 SHEETS—SHEET 1.
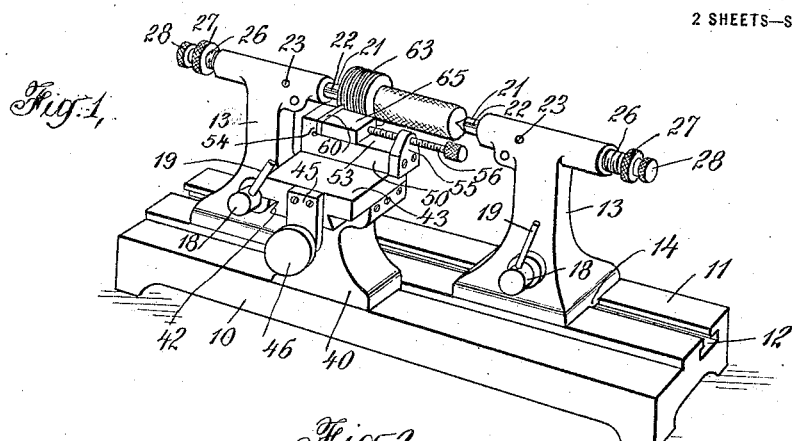
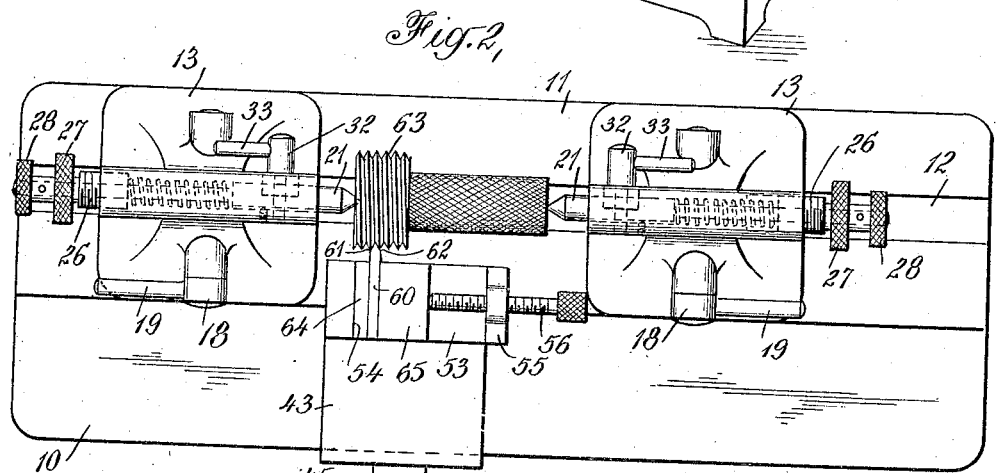
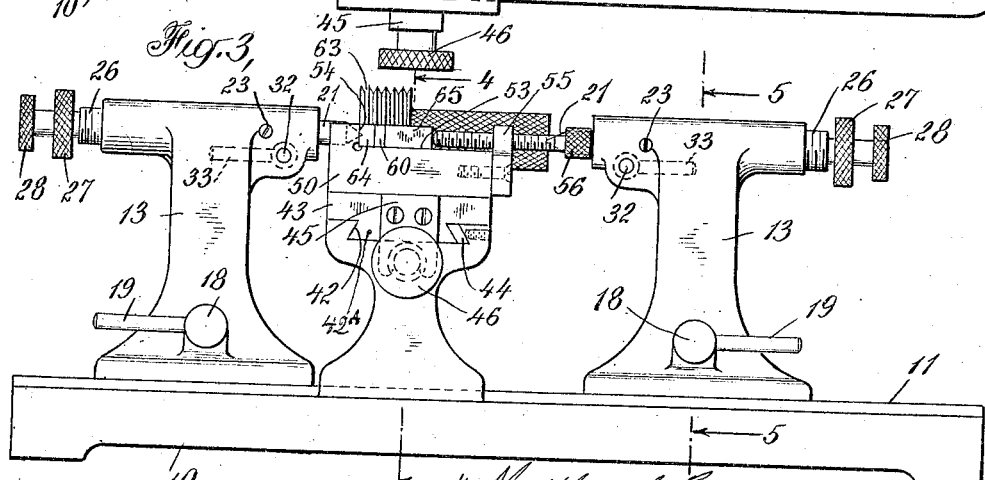

M. S. CUMNER AND F. W. GEISSENHAINER.
LEAD TESTING APPARATUS.
APPLICATION FILED SEPT. 18, 1918.
1,307,347.
Patented June 24, 1919.
2 SHEETS—SHEET 2.
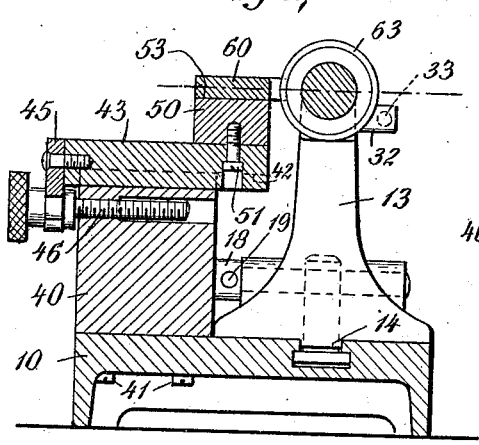
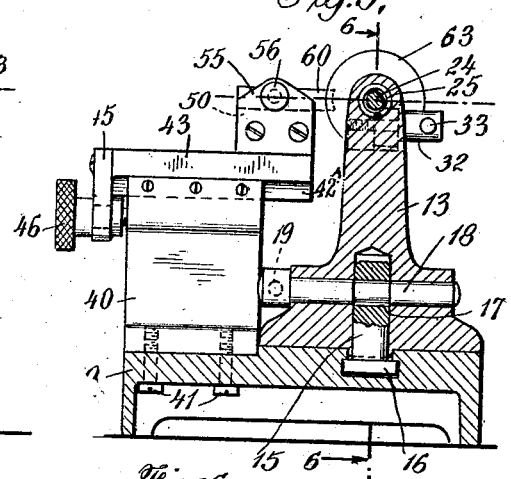
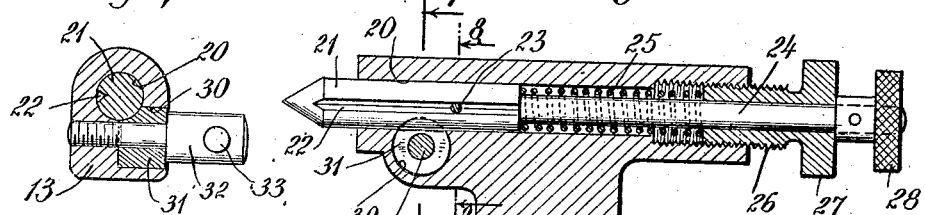
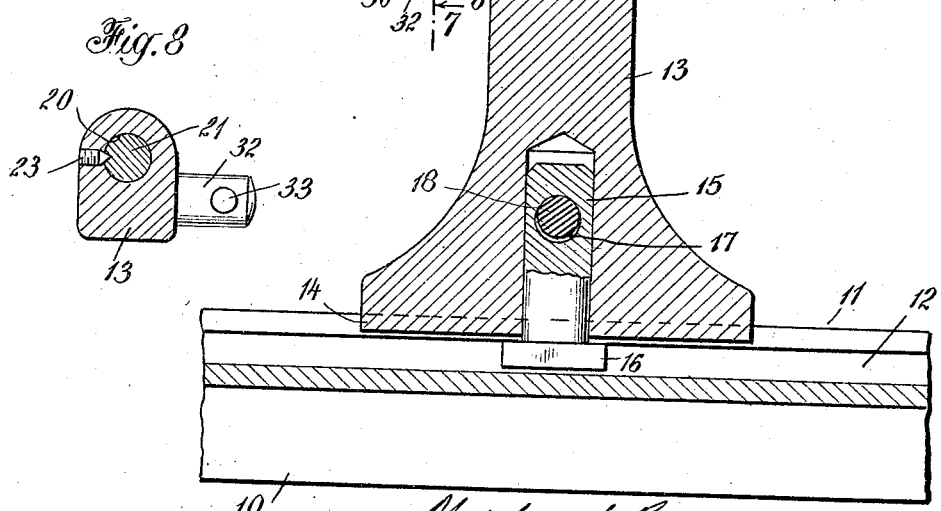

UNITED STATES PATENT OFFICE.

MATTHEW S. CUMNER, OF NEW YORK, N. Y., AND FREDERICK W. GEISSENHAINER, OF FREEHOLD, NEW JERSEY, ASSIGNORS TO NESTOR MANUFACTURING COMPANY, INC., OF NEW YORK, N. Y., A CORPORATION OF NEW YORK.

LEAD-TESTING APPARATUS.

1,307,347.           Specification of Letters Patent.      Patented June 24, 1919.

Application filed September 18, 1918. Serial No. 254,563.

*To all whom it may concern:*

Be it known that we, MATTHEW S. CUMNER, a citizen of the United States of America, and a resident of New York, county and State of New York, and FREDERICK W. GEISSENHAINER, a citizen of the United States of America, and a resident of Freehold, Monmouth county, and State of New Jersey, have invented certain new and useful Improvements in Lead-Testing Apparatus, of which the following is a specification, reference being had to the accompanying drawings, forming a part thereof.

Our invention relates to new and useful apparatus for testing the lead or pitch of machine screws and its object is to provide a simple apparatus by means of which this work may be facilitated and done quickly and with great accuracy.

In order that our invention may be thoroughly understood we will now proceed to describe the same in the following specification and will then point out the novel features thereof in appended claims.

Referring to the drawings:

Figure 1 is a perspective view of an apparatus which is made according to and embodies our invention.

Fig. 2 is a plan view, and

Fig. 3 a front elevation of the same device.

Figs. 4 and 5 are sectional end elevations, taken on the lines 4—4 and 5—5 respectively, of Fig. 3.

Fig. 6 is a sectional front elevation of one of the center supports on a larger scale, the section being taken on the line 6—6 of Fig. 5.

Figs. 7 and 8 are sectional end elevations of some of the parts shown in Fig. 6, the sections being taken respectively on the lines 7—7 and 8—8 of the latter figure.

Like characters of reference designate corresponding parts in all the figures.

10 designates a base upon which the various parts of the device are mounted. This is constructed to form a track 11 with a central undercut groove 12. On this track are placed the pedestals 13—13, each of which has projecting from its under surface a rib 14 which closely fits the groove 12. 15 is a pin which has a head 16 in the undercut part of the groove and the shank of which projects into a vertical hole in the pedestal. The pin is provided with a transverse hole 17. 18 is a rotative rod which passes through the pedestal and through the hole 17. The part of rod 18 which passes through the pin 15 is eccentrically reduced in diameter. A handle 19 near the outer end of the rod affords means for rotating it and the parts are so arranged that this rotation raises the pin 15 so that its head 16 is tightened against the upper surface of the undercut part of the groove 12 to thereby lock the pedestal to the base. Both of the pedestals 13—13 are similarly provided with locking devices. By means of this arrangement the pedestals may be spaced and positioned on the base.

Each pedestal is provided with a bore 20 in exact parallelism with the rib 14. In this bore is accurately fitted a supporting center 21 which is provided with a longitudinal groove 22. The end of a screw 23 projects into this groove and prevents the center from rotating. 24 is the shank of the center which is of reduced diameter and is surrounded by a compression spring 25. A thread member 26 having a knurled head 27 also surrounds the shank 24 and screws into a thread in the rear end of the pedestal in alinement with the bore 20. By means of this member the compression of spring 25 may be adjusted. 28 is a knurled head affixed to the rear end of the shank 24 which limits the forward movement of the center 21 and by means of which the center may be drawn into the hole 20.

In order to lock the supporting center to the pedestal without distorting its alinement, the following device is provided. A transverse hole 30 is bored into the pedestal in such a position that it runs into the lower side of the bore 20. A bushing 31 fits this hole. An edge of the bushing is cut away on about the same radius as that of the bore 20. This bushing has a central clearance hole for a clamping screw 32 which runs into threads in the pedestal and which is provided with a tightening handle 33.

40 is a stationary pedestal fastened to the base 10 by screws 41. Its upper surface is parallel with the axis of the holding centers and in it is a dovetail groove 42 Fig. 3 normal to this axis. 43 is a block rest slide the edges of which rest on this surface, and which has an integral part 42^A which goes through the groove 42 and fits between one side of the groove and a gib 44 also shown in Fig. 3. At one end of the block rest slide is affixed a bracket 45 the lower end of which is forked and fitted into a groove in an adjusting screw 46 Fig. 4. This screw fits a threaded hole in the pedestal 40 and serves to move the block rest slide in and out toward and from the vertical plane through the supporting centers.

50 designates a block rest which is affixed to the slide 40 by screws 51. This is hardened and ground to have a perfectly flat smooth upper surface 53. At one end it is raised and a surface 54 of its raised portion is ground flat at right angles to the surface 53 and at right angles to the axis of the supporting centers 21. At its other end a block clamp 55 is attached. This is provided with a threaded hole which receives a block clamp screw 56.

60 is a test gage having a perfectly rectangular body and a pointed end. This is a hardened and ground piece and the end is ground to form two plane surfaces 61 and 62 Fig. 2 at right angles to the top and bottom sides and at a relative angle corresponding with the pitch angle of the screw to be treated which in the drawings is shown as a standard thread gage and designated by 63.

We will now describe the way this apparatus is used. The threaded piece to be tested, such as the screw gage 63, is placed between the pedestals 13 on the supporting centers 21. The relative position of the pedestals is adjusted to accomplish this and the members 26 rotated to get the desired endwise pressure on the gage. The supporting centers may then be locked if desired by tightening the screws 32. This tightening arrangement is such that it may be used without disturbing the alinement of the supporting centers which must be very accurate. The position of the block rest 50 is adjusted to bring it near the thread gage. Now the test gage 60 is placed on the block rest with two of its surfaces in engagement with the surfaces 53 and 54 and with its pointed end in one of the threads of the thread gage as shown in Fig. 1. Figs. 4 and 5 show that a line through the center of the thread gage and parallel with the surface 53 passes midway between the upper and lower surfaces of the test gage. By turning the thread gage slightly an adjustment may be made to bring the surfaces 61 and 62 into contact with opposite sides of a thread on the thread gage. This may be seen by the use of a magnifying glass or microscope. When a microscope is used it is convenient to mount it on the block rest slide 43. An examination of the parts thus positioned will show if the thread of the thread gage has been cut or ground at the proper angle.

Now the test gage 60 is moved back and a block 64 Figs. 2 and 3 of standard thickness corresponding with the required distance between two or more threads of the thread gage, is interposed between the surface 54 of the block rest and the adjacent surface of the test gage. The latter is then moved forward into another part of the thread and if the pitch or lead is correct its surfaces 61 and 62 will contact with the sides of the thread. If it is incorrect, the amount of its inaccuracy may be measured by substituting another block or blocks for the block 64 and comparing the difference in thickness of the blocks used.

If it is desired to clamp the test gage or the gage and blocks onto the block rest, the screw 56 is used preferably with another block 65 interposed between the end of the screw and the test gage to prevent injury to its surface.

This operation may be repeated between different parts of the thread lying in a simple plane, and by partially rotating the thread gage, other parts of its thread which lie in other planes may be examined and measured. Thus with this simple apparatus lead tests may be made quickly and accurately. The thread gage may be removed readily by releasing one of the screws 32 and pulling back the knob 28.

A structure of preferred form and construction has been illustrated and described for the purpose of showing ways in which this invention may be used, but we intend no limitations other than those imposed by the appended claims.

What we claim is:

1. A lead testing apparatus comprising means for supporting a threaded article, a block rest having a finished plane surface parallel with the axis of the threaded article, and another finished plane surface at right angles to said first surface and to said axis, a test gage having a rectangular body, and a pair of converging surfaces at substantially right angles to its under surface, and a spacing block having parallel sides at a known distance apart, said spacing block being adapted to be placed on one of said surfaces of the block rest with the test gage and interposed between the test gage and the other of said surfaces of the block rest.

2. A lead testing apparatus comprising a pair of spaced supporting centers in alinement with each other, for holding a threaded article, means for adjusting the distance between said centers, a block rest having a finished plane surface parallel with the axis of the centers, and another finished plane surface at right angles to said first surface and to said axis, a test gage having a rectangular body, and a pair of converging surfaces at substantially right angles to its under surface, and a spacing block having parallel sides at a known distance apart, said spacing block being adapted to be placed on one of said surfaces of the block rest with the test gage and interposed between the test gage and the other of said surfaces of the block rest.

3. A lead testing apparatus comprising a pair of spaced supporting centers in alinement with each other, for holding a threaded article, means for adjusting the distance between said centers, a block rest having a finished plane surface parallel with the axis of the centers, and another finished plane surface at right angles to said first surface and to said axis, means for moving the block rest toward and from the supporting centers, a test gage having a rectangular body, and a pair of converging surfaces at substantially right angles to its under surface, and a spacing block having parallel sides at a known distance apart, said spacing block being adapted to be placed on one of said surfaces of the block rest with the test gage and interposed between the test gage and the other of said surfaces of the block rest.

4. A lead testing apparatus comprising a pair of spaced supporting centers in alinement with each other, for holding a threaded article, means for adjusting the distance between said centers, a block rest having a finished plane surface parallel with the axis of the centers at a fixed distance below said centers, and another finished plane surface at right angles to said first surface and to said axis, a test gage having a rectangular body, the thickness of which is double the distance of said first block rest center below the axis of the supporting centers, and a pair of converging surfaces at substantially right angles to its under surface, and a spacing block having parallel sides at a known distance apart, said spacing block being adapted to be placed on one of said surfaces of the block rest with the test gage and interposed between the test gage and the other of said surfaces of the block rest.

5. A lead testing apparatus comprising a base, a pair of spaced pedestals supported thereon, means for holding the pedestals in adjusted position, a pair of supported centers slidably supported in the pedestals in axial alinement with each other, a spring back of at least one of said centers, a block rest having a finished plane surface parallel with the axis of the centers, and another finished plane surface at right angles to said first surface and to said axis, a test gage having a rectangular body, and a pair of converging surfaces at substantially right angles to its under surface, and a spacing block having parallel sides at a known distance apart, said spacing block being adapted to be placed on one of said surfaces of the block rest with the test gage and interposed between the test gage and the other of said surfaces of the block rest.

6. A lead testing apparatus comprising a base, a pair of spaced pedestals supported thereon, means for holding the pedestals in adjusted positions, a pair of supporting centers slidably supported on the pedestals in axial alinement with each other, a spring back of at least one of said centers, means for locking said center in the pedestal without disturbing its alinement, a block rest having a finished plane surface parallel with the axis of the centers, and another finished plane surface at right angles to said first surface and to said axis, a test gage having a rectangular body, and a pair of converging surfaces at substantially right angles to its under surface and a spacing block having parallel sides at a known distance apart, said spacing block being adapted to be placed on one of said surfaces of the block rest with the test gage and interposed between the test gage and the other of said surfaces of the block rest.

7. A lead testing apparatus comprising a base, a pair of spaced pedestals supported thereon, means for holding the pedestals in adjusted positions, a pair of supporting centers slidably supported on the pedestals in axial alinement with each other, a spring back of at least one of said centers, a releasing device for sliding said center back against the spring, a block rest having a finished plane surface parallel with the axis of the centers, and another finished plane surface at right angles to said first surface and to said axis, a test gage having a rectangular body, and a pair of converging surfaces at substantially right angles to its under surface and a spacing block having parallel sides at a known distance apart, said spacing block being adapted to be placed on one of said surfaces of the block rest with the test gage and interposed between the test gage and the other of said surfaces of the block rest.

8. A lead testing apparatus comprising a base, a pair of spaced pedestals supported thereon, means for holding the pedestals in adjusted positions, a pair of supporting centers slidably supported on the pedestals in axial alinement with each other, a spring back of at least one of said centers, a releasing device for sliding said center back against the spring, a clamp arranged to be tightened against a portion of said center without disturbing its alinement, a block rest having a finished plane surface parallel with the axis of the centers, and another finished plane surface at right angles to said first surface and to said axis, a test gage having a rectangular body, and a pair of converging surfaces at substantially right angles to its under surface and a spacing block having parallel sides at a known distance apart, said spacing block being adapted to be placed on one of said surfaces of the block rest with the test gage and interposed between the test gage and the other of said surfaces of the block rest.

In witness whereof, we have hereunto set our hands this 16th day of September, 1918.

MATTHEW S. CUMNER.
FREDK. W. GEISSENHAINER.

Copies of this patent may be obtained for five cents each, by addressing the "Commissioner of Patents, Washington, D. C."